(No Model.)
G. HENDERSON.
MECHANICAL MOVEMENT.
No. 389,509. Patented Sept. 11, 1888.
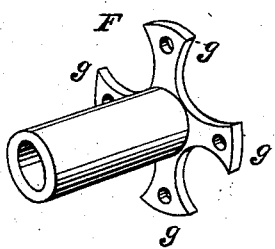
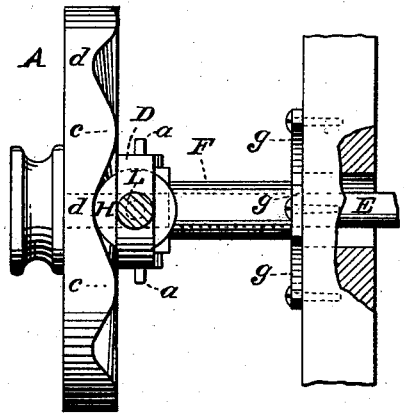
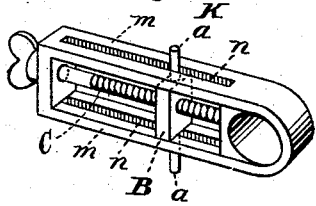
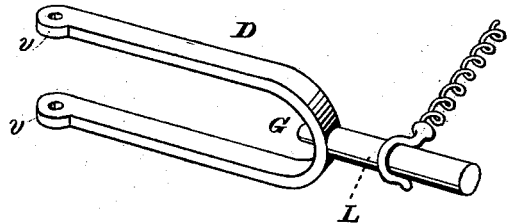
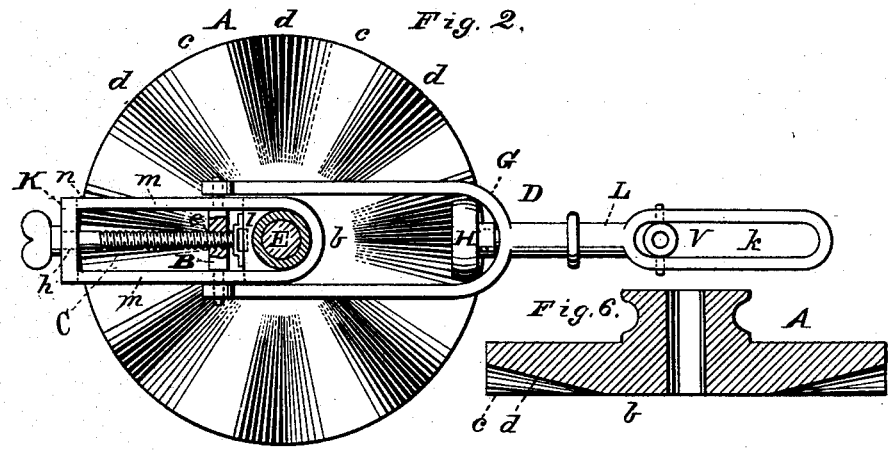
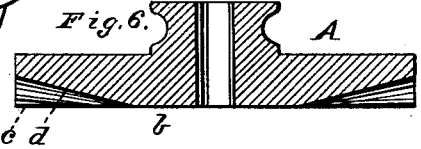
WITNESSES
Villette Anderson.
C. R. Ferguson
INVENTOR
George Henderson
by E. W. Anderson
Attorney

United States Patent Office.

GEORGE HENDERSON, OF SIOUX CITY, IOWA.

MECHANICAL MOVEMENT.

SPECIFICATION forming part of Letters Patent No. 389,509, dated September 11, 1888.

Application filed May 21, 1888. Serial No. 274,616. (No model.)

*To all whom it may concern:*

Be it known that I, GEORGE HENDERSON, a citizen of the United States, and a resident of Sioux City, in the county of Woodbury and State of Iowa, have invented certain new and useful Improvements in Mechanical Movements; and I do declare the following to be a full, clear, and exact description of the invention, such as will enable others skilled in the art to which it appertains to make and use the same, reference being had to the accompanying drawings, and to letters or figures of reference marked thereon, which form a part of this specification.

Figure 1 of the drawings is a representation of this invention and is a side view. Fig. 2 is a plan view of the pulley, a section being taken across the shaft and its bearing. Figs. 3, 4, 5, and 6 are details.

This invention has relation to mechanical movements adapted to convert rotary into vibratory motion; and it consists in the construction and novel combination of devices, as hereinafter set forth, and pointed out in the appended claims.

In the accompanying drawings, the letter A designates a pulley, the side of which is formed with radial wave-like rises and depressions or flutings, which increase in depth from the hub portion outward. Near the shaft, as at $b$, the surface of the pulley is plane. The rises and depressions forming the flutings are indicated at $c$ and $d$, respectively.

E is the shaft or journal of the pulley, and F is a sleeve thereon, which is designed to be secured to some fixed support by means of screws passing through its flanges $g$. The screw-bracket K is formed with a bearing, $l$, at its inner end, which is designed to engage on the sleeve F, sufficiently loose to allow it to be adjusted radially thereon by slight taps with a hammer. If deemed necessary, a thumb-screw may be provided to secure the bracket as adjusted. The side arms, $m$, of the bracket are provided with longitudinal slots $n$, through which project the lugs $a$ of the tapped block B, the threaded aperture in which is indicated at $e$.

C is the screw, which turns in bearings at $h$ in the bracket, and when turned causes the block B to move along the bracket toward or from the axial portion or bearing $l$.

D represents a lever having at one end a yoke portion, G, wide enough to span the bracket K, and provided with apertures $v$ in its branches adapted to receive the ends of the lugs $a$ of the tapped block B, said lugs forming the fulcrum of the lever D. This lever is provided with an anti-friction roller, H, which is designed to bear on the flutings of the driving-pulley when the latter is turned, the lever being held toward the fluted face of the pulley by a spring applied to its arm L, which extends in the direction of the sieve or other device which is to be vibrated. The arm L may be slotted, as at $k$, and provided with an adjustable bearing, $v$, for convenient attachment to a pitman or rod connection extending to the article to be vibrated. The length of vibrations can be changed by moving the screw and without stopping the machine. When the lever is adjusted so as to move the roller H to the shallower portions of the flutings near the hub or center of the pulley, the vibrations will be short, and when adjusted outward or toward the rim of the pulley the vibrations will be comparatively long. When the roller is on the plane surface $b$ around the center of the pulley, there will be no vibratory movement of the lever.

Having described this invention, what I claim, and desire to secure by Letters Patent, is—

1. The mechanical movement consisting of the fluted driving-pulley, a bracket-bearing carrying an adjusting-screw, and a lever extending across the fluted face of the pulley and having a fulcrum adjustable by means of said screw, substantially as specified.

2. The combination, with a pulley having radial flutings on its side, of a bracket-bearing carrying an adjusting-screw, a tapped fulcrum-block on said screw, and a slotted lever pivoted on said block and provided with a roller-bearing to engage the fluted side of the pulley, and a spring, substantially as specified.

In testimony whereof I affix my signature in presence of two witnesses.

GEORGE HENDERSON.

Witnesses:
W. F. REINSH,
GUST. BERGDAHL.